No. 635,027. Patented Oct. 17, 1899.
W. SCANTLEBURY.
OPTICAL APPARATUS.
(Application filed Oct. 18, 1898.)
(No Model.)

WITNESSES
INVENTOR
William Scantlebury
by Herbert W. T. Jenner
Attorney

THE NORRIS PETERS CO., PHOTO-LITHO., WASHINGTON, D. C.

UNITED STATES PATENT OFFICE.

WILLIAM SCANTLEBURY, OF ANACOSTIA, DISTRICT OF COLUMBIA.

OPTICAL APPARATUS.

SPECIFICATION forming part of Letters Patent No. 635,027, dated October 17, 1899.

Application filed October 18, 1898. Serial No. 693,865. (No model.)

*To all whom it may concern:*

Be it known that I, WILLIAM SCANTLEBURY, a citizen of the United States, residing at Anacostia, in the District of Columbia, have invented certain new and useful Improvements in Optical Apparatus; and I do hereby declare the following to be a full, clear, and exact description of the invention, such as will enable others skilled in the art to which it appertains to make and use the same.

This invention relates to apparatus for illustrating certain phenomena in the properties of rays of light and their action on the human eye; and it consists in the novel construction and combination of the parts hereinafter fully described and claimed.

Figure 1:
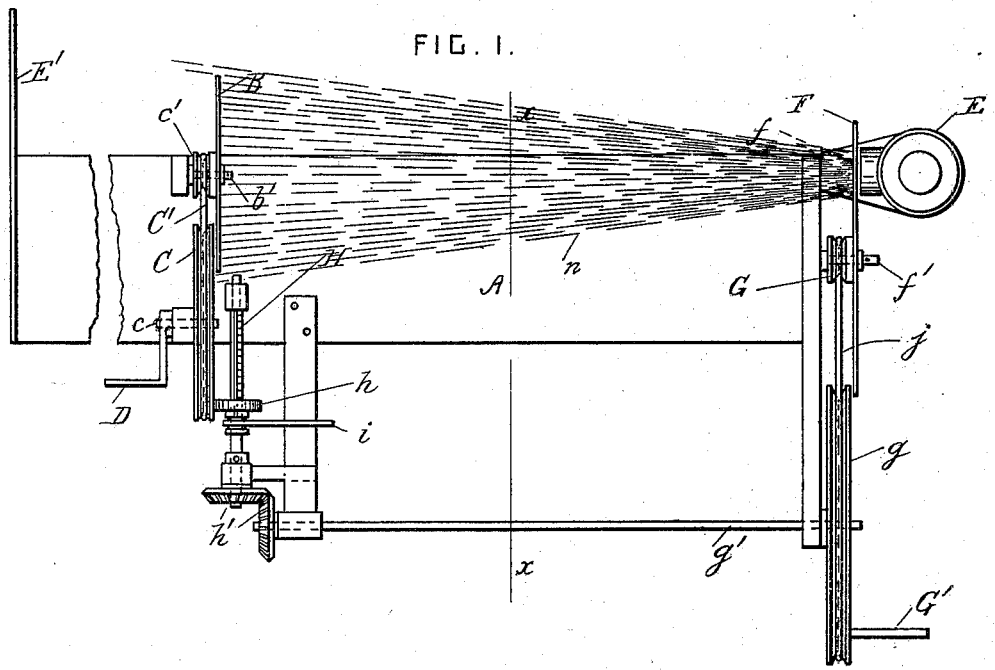
Figure 2:
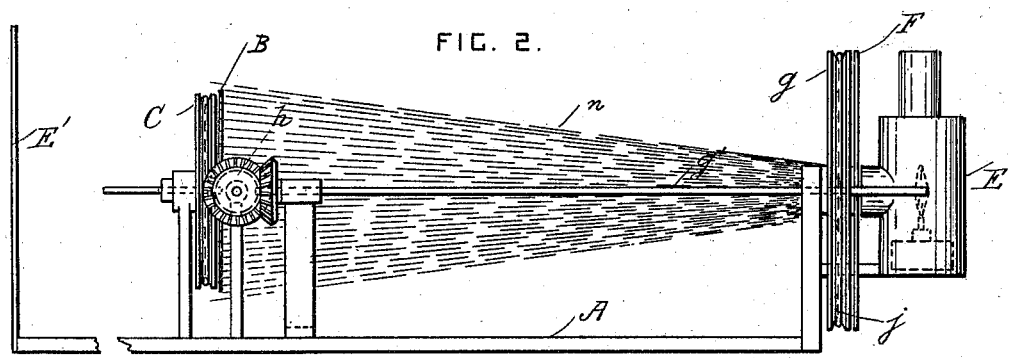
Figure 3:
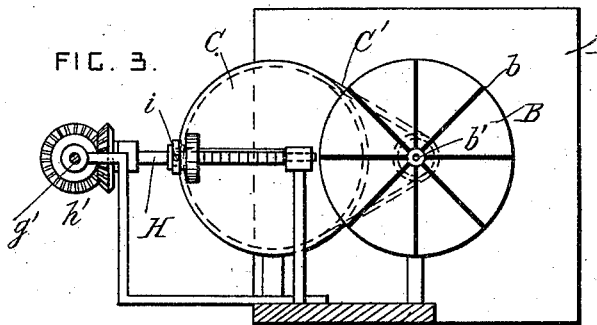
Figure 4:
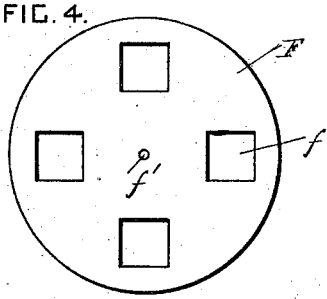

In the drawings, Figure 1 is a plan view of the apparatus. Fig. 2 is a side view of the same. Fig. 3 is a cross-section taken on the line $x\,x$ in Fig. 1. Fig. 4 is a detail view of the shutter.

A is a supporting frame or stand.

B is the object to be exhibited, in this case consisting for the purpose of illustration of a disk provided with a white or colorless background and having black radial bars $b$ upon it. The background may be transparent and the bars may be opaque; but the object to be exhibited may be varied indefinitely in form, color, and material, provided it bears some visible mark, markings, or device upon its surface which is in contrast to its background. The object or disk B is set in motion, so that its markings are repeatedly removed from and restored to their original positions with such rapidity as to cause them to be normally invisible. This is best accomplished by mounting the disk B on a shaft $b'$, carried by the frame, and revolving the disk rapidly.

C is a large driving-pulley mounted on a shaft $c$, which is journaled in the frame, and $c'$ is a small pulley secured to the disk B.

C' is a cord which passes around the pulleys C and $c'$.

The shaft $c$ is provided with a crank-handle D for revolving it. Any other approved driving mechanism may be used to keep the object B in motion, such as an electric motor.

E is a lamp or lanthorn for illuminating the object B. The apparatus is used in the dark, and any approved means for casting a beam of light on the object may be used, such as the said lamp. When the object B is opaque, it is preferably arranged at a considerable distance from the lamp, so that it can be seen by several persons. When the object is transparent or partially transparent, a screen E' may be placed behind it, and the object may then be placed closer to the lamp, as the picture of it on the screen can be studied by a number of persons, and the changes in the picture on the screen are in many respects the same as those seen when looking at the object itself.

F is a shutter interposed between the lamp and the object B or its picture on the screen. This shutter preferably consists of a perforated disk, and several perforations $f$ are preferably used. The disk F is mounted on a shaft $f'$, carried by the frame, and it is revolved rapidly by any approved means. One perforation $f$ would be operative; but a series of perforations $f$ is preferably provided in the disk in order that it may not have to be revolved at so high a speed as it would if only one perforation were provided.

The means for revolving the disk F preferably consists of a small pulley G, secured to the disk, a large pulley $g$, mounted on a shaft $g'$, which is journaled in the frame, a crank-handle G', projecting from the pulley $g$, and a cord $j$, passing around the pulleys G and $g$.

In operating this apparatus the shutter is revolved at a much greater speed than the object under observation. When the object is stationary and the shutter is revolved rapidly, the beams of light from the lamp illuminate it by passing through the perforations or openings $f$ in rapid succession, and the object or its picture on the screen is almost as clearly visible as if the shutter were stationary and the lamp projected an unbroken beam of light through one of its perforations continuously. The dotted lines $n$ indicate the light proceeding from the lamp, the object B being arranged wholly within the field of illumination. When the shutter is stationary and the illuminated object is revolved rapidly, the device on it becomes invisible. The radial black bars of the disk shown in the drawings become blurred and merged into the white background, so that a very pale gray disk is seen. When the shutter is revolved rapidly and the hand and arm are waived in front of it, or the disk is revolved at a moderate speed corresponding with that of waiving a hand and arm and so that the device on the disk is not wholly invisible, the usual phenomena resulting from the persistence of vision and as heretofore demonstrated by the stroboscope are observable. When, however, both the disk B and the shutter are revolved with the rapidity hereinbefore described, some very peculiar phenomena are observable. Numerous radial black lines now appear visible on the normally-invisible disk B, with white spaces between them. The number of these black lines varies greatly, according to the ratio or difference of the speeds of the disk B and the shutter. With a certain change in the ratio of the speed of the shutter with relation to the speed of the disk B white radial lines appear having dark-gray spaces between them. The number of the black or white lines is in excess of the number of bars actually on the disk, and although at some ratio of the speeds these lines appear stationary they usually have a circular motion, sometimes revolving slowly in the direction in which the disk is actually turning and sometimes revolving slowly in the reverse direction. Within certain limits of speed a very small change in the ratio of the speeds of the disk and shutter makes a great difference in the appearance of what is seen on the disk.

This apparatus is used in the lecture-hall to demonstrate and exhibit to students the phenomena hereinbefore described for the purpose of illustration, and also many other phenomena too numerous to mention.

The object B and the shutter can be revolved by hand separately or by separate electric motors, and the ratio of their speeds can be determined in various ways.

In order to enable one operator to revolve both the object B and the shutter and at the same time to vary the ratio of their speeds and observe the amount of the change in the ratio, the pulleys C and $g$ are operatively connected by intermediate driving mechanism.

H is a shaft journaled in suitable bearings and having a friction-wheel $h$ splined on it. The wheel $h$ bears against the side of the pulley C, which forms a friction-disk. The shaft H is connected to the shaft $g'$ by intergearing beveled toothed wheels $h'$. The friction-wheel $h$ is provided with a suitable handle $i$, which engages with a groove in its hub and affords a means for sliding it on its shaft, and its shaft is graduated to indicate the difference in the ratio of the speeds of the disk B and the shutter. Both shutter and disk can be revolved by turning the crank-handle G, or the friction-wheel $h$ can be slid out of contact with the pulley C, and the pulley C can be revolved separately.

What I claim is—

1. In a stroboscope, the combination, with a source of light, and an object arranged wholly within the field of illumination; of a shutter arranged between the said source of light and object, and a single driving device and intermediate connections operating to revolve the said object and shutter simultaneously, substantially as set forth.

2. In a stroboscope, the combination, with a source of light, and an object arranged wholly within the field of illumination; of a shutter arranged between the said source of light and object, a single driving device and intermediate connections operating to revolve the said object and shutter simultaneously, and means for varying the ratio of the velocities of the said object and shutter, substantially as set forth.

3. In a stroboscope, the combination, with a source of light, and an object arranged wholly within the field of illumination; of a shutter arranged between the said source of light and object, a single driving device operating to revolve the said object and shutter simultaneously, and intermediate connections provided with a slidable friction-wheel permitting the ratio of the velocities of the said object and shutter to be varied while the said parts are in motion, substantially as set forth.

In testimony whereof I affix my signature in presence of two witnesses.

WILLIAM SCANTLEBURY.

Witnesses:
HERBERT W. T. JENNER,
BERTHA L. DANA.